US011870849B2

(12) United States Patent
Pope et al.

(10) Patent No.: US 11,870,849 B2
(45) Date of Patent: Jan. 9, 2024

(54) SAFETY NETWORK OF THINGS

(71) Applicant: Intrado Life & Safety, Inc., Omaha, NE (US)

(72) Inventors: Adan K. Pope, Omaha, NE (US); Michel Brkovic, St-Eustache, CA (US)

(73) Assignee: Intrado Life & Safety, Inc., Longmont, CO (US)

( * ) Notice: Subject to any disclaimer, the term of this patent is extended or adjusted under 35 U.S.C. 154(b) by 0 days.

(21) Appl. No.: 17/566,109

(22) Filed: Dec. 30, 2021

(65) Prior Publication Data

US 2023/0189183 A1   Jun. 15, 2023

Related U.S. Application Data

(63) Continuation of application No. 17/548,564, filed on Dec. 12, 2021, now Pat. No. 11,522,958.

(51) Int. Cl.
| *H04W 4/38* | (2018.01) |
| *H04L 67/52* | (2022.01) |
| *H04W 4/021* | (2018.01) |
| *H04L 67/12* | (2022.01) |
| *H04L 9/40* | (2022.01) |
| *H04W 60/00* | (2009.01) |

(52) U.S. Cl.
CPC .......... *H04L 67/12* (2013.01); *H04L 63/0428* (2013.01); *H04L 67/52* (2022.05); *H04W 4/021* (2013.01); *H04W 4/38* (2018.02); *H04W 60/00* (2013.01)

(58) Field of Classification Search
CPC ..... H04L 67/52; H04L 67/53; H04L 61/5007; H04L 63/102; H04L 12/2823; H04W 4/021; H04W 4/38; H04W 12/63; H04W 4/025; H04W 4/029
See application file for complete search history.

(56) References Cited

U.S. PATENT DOCUMENTS

| 8,219,684 | B1 | 7/2012 | Dean |
| 8,892,752 | B2 | 11/2014 | Singh et al. |
| 9,689,988 | B1 | 6/2017 | Martin et al. |
| 9,794,755 | B1 * | 10/2017 | South .................... H04W 4/021 |
| 10,421,437 | B1 * | 9/2019 | Koskan ............. G08B 21/0261 |
| 10,856,136 | B1 | 12/2020 | Espy et al. |

(Continued)

OTHER PUBLICATIONS

Non Final Office Action in U.S. Appl. No. 17/548,564 dated Jun. 10, 2022, 16 pages.

(Continued)

*Primary Examiner* — George C Neurauter, Jr.
*Assistant Examiner* — Linh T. Nguyen
(74) *Attorney, Agent, or Firm* — Patent Capital Group

(57) ABSTRACT

An apparatus includes a network interface that receives a registration request and an event notification, the registration request indicating an identity of a sensor and a physical location of the sensor, the event notification identifying a location of an event. The apparatus also includes a processing unit that determines a first geofence, at least in part based on the location and a distance from the location. The processing unit determines that the sensor is within the first geofence, at least in part based on the physical location of the sensor. The network interface transmits a request indicating the sensor and receives a response including data associated with the sensor.

17 Claims, 8 Drawing Sheets

(56) References Cited

U.S. PATENT DOCUMENTS

| | | | |
|---|---|---|---|
| 11,349,867 | B2 | 5/2022 | Fainberg et al. |
| 11,423,171 | B2 | 8/2022 | Booth, Jr. et al. |
| 11,463,525 | B1 | 10/2022 | Rath et al. |
| 11,600,166 | B1 | 3/2023 | Trépanier et al. |
| 2005/0034164 | A1 | 2/2005 | Sano et al. |
| 2007/0297607 | A1 | 12/2007 | Ogura et al. |
| 2008/0261557 | A1* | 10/2008 | Sim .................. H04W 4/02 455/404.2 |
| 2009/0031006 | A1* | 1/2009 | Johnson ........... H04M 3/42348 709/218 |
| 2010/0003961 | A1* | 1/2010 | Ray .................. H04W 4/90 455/404.2 |
| 2011/0287737 | A1* | 11/2011 | Jones ................ H04W 76/50 455/456.1 |
| 2012/0162220 | A1 | 6/2012 | Sakurai et al. |
| 2013/0052983 | A1 | 2/2013 | Fletcher et al. |
| 2013/0100306 | A1 | 4/2013 | Bekiares et al. |
| 2014/0295786 | A1 | 10/2014 | Maier et al. |
| 2014/0304352 | A1 | 10/2014 | Chaudhary et al. |
| 2014/0352400 | A1 | 12/2014 | Barrilado et al. |
| 2014/0368601 | A1* | 12/2014 | deCharms ............ H04N 7/147 348/14.02 |
| 2015/0030155 | A1 | 1/2015 | Park et al. |
| 2015/0254463 | A1 | 9/2015 | Ryhorchuk et al. |
| 2015/0339911 | A1* | 11/2015 | Coyne ................. H04N 7/181 340/517 |
| 2016/0042767 | A1 | 2/2016 | Araya et al. |
| 2016/0165435 | A1 | 6/2016 | Mu |
| 2016/0344983 | A1 | 11/2016 | Yoshimura et al. |
| 2017/0150031 | A1 | 5/2017 | Oshima et al. |
| 2017/0155767 | A1 | 6/2017 | Cohen |
| 2017/0195475 | A1* | 7/2017 | Mehta ................. G08B 25/009 |
| 2017/0208045 | A1 | 7/2017 | Huh et al. |
| 2017/0238129 | A1 | 8/2017 | Maier et al. |
| 2017/0280283 | A1 | 9/2017 | Venkatraman et al. |
| 2017/0347133 | A1 | 11/2017 | Wang et al. |
| 2018/0189835 | A1 | 7/2018 | Deluca et al. |
| 2018/0255023 | A1 | 9/2018 | Whaley et al. |
| 2018/0310159 | A1 | 10/2018 | Katz et al. |
| 2019/0013945 | A1 | 1/2019 | Hamlin et al. |
| 2019/0045331 | A1 | 2/2019 | Liang et al. |
| 2019/0193734 | A1 | 6/2019 | Ekl et al. |
| 2019/0320310 | A1 | 10/2019 | Horelik et al. |
| 2019/0380020 | A1* | 12/2019 | Pellegrini ............ H04W 4/025 |
| 2020/0055186 | A1 | 2/2020 | Nocon et al. |
| 2020/0084178 | A1* | 3/2020 | Dreyer ................ H04L 41/0856 |
| 2020/0145809 | A1 | 5/2020 | Cavendish et al. |
| 2020/0258606 | A1 | 8/2020 | Ferentz et al. |
| 2020/0259705 | A1 | 8/2020 | Mercier et al. |
| 2020/0380436 | A1 | 12/2020 | Bonomo |
| 2020/0409537 | A1 | 12/2020 | Story et al. |
| 2021/0006961 | A1* | 1/2021 | King-Berkman ....... H04W 4/90 |
| 2021/0020007 | A1 | 1/2021 | Vazirani |
| 2021/0084563 | A1 | 3/2021 | Ogura et al. |
| 2021/0289334 | A1 | 9/2021 | Martin et al. |
| 2021/0349066 | A1 | 11/2021 | Chilla et al. |
| 2022/0027417 | A1 | 1/2022 | Katz et al. |
| 2022/0141637 | A1 | 5/2022 | Pellegrini et al. |
| 2022/0191672 | A1 | 6/2022 | Dizengof et al. |
| 2022/0210272 | A1* | 6/2022 | Horelik ................ H04M 3/5116 |
| 2022/0248203 | A1 | 8/2022 | Anderson |
| 2022/0269887 | A1 | 8/2022 | Chee et al. |
| 2022/0353060 | A1 | 11/2022 | Saarnivala et al. |
| 2022/0353635 | A1 | 11/2022 | Garg et al. |
| 2022/0394341 | A1 | 12/2022 | Riepling et al. |
| 2022/0417007 | A1 | 12/2022 | Zhou et al. |
| 2023/0097022 | A1* | 3/2023 | Leavitt .................. H04W 76/15 370/329 |

OTHER PUBLICATIONS

Non-Final Office Action in U.S. Appl. No. 17/587,199 dated Oct. 20, 2022, 25 pages.

Notice of Allowance in U.S. Appl. No. 17/548,564 dated Oct. 14, 2022, 9 pages.

Non-Final Office Action in U.S. Appl. No. 17/584,924 dated Sep. 13, 2022, 18 pages.

Non-Final Office Action in U.S. Appl. No. 17/584,924 dated Mar. 20, 2023, 24 pages.

Non-Final Office Action in U.S. Appl. No. 17/946,075 dated Mar. 22, 2023, 20 pages.

Non-Final Office Action in U.S. Appl. No. 17/587,199 dated May 3, 2023, 25 pages.

Non-Final Office Action in U.S. Appl. No. 17/584,924 dated Aug. 25, 2023, 22 pages.

Notice of Allowance in U.S. Appl. No. 17/946,075 dated Oct. 4, 2023, 10 pages.

Non-Final Office Action in U.S. Appl. No. 17/587,199 dated Nov. 7, 2023, 30 pages.

\* cited by examiner

| Event ID | Location | Distance | Time/Date | Device IDs | Data Hashes | Associated Event IDs |
|---|---|---|---|---|---|---|
| 1001 | 1234 Mass Ave | 500 ft. | 2/1/15, 10:00 am | 2412 | 0XEF34 | 1003 |
| 1002 | 1 Card Drive | | 2/1/15, 10:15 am | 4551 | 0X2424 | - |
| 1003 | 1217 Mass Ave | 400 ft. | 2/1/15, 10:30 am | 5644 | 0XBE12 | 1001 |

Fig. 4

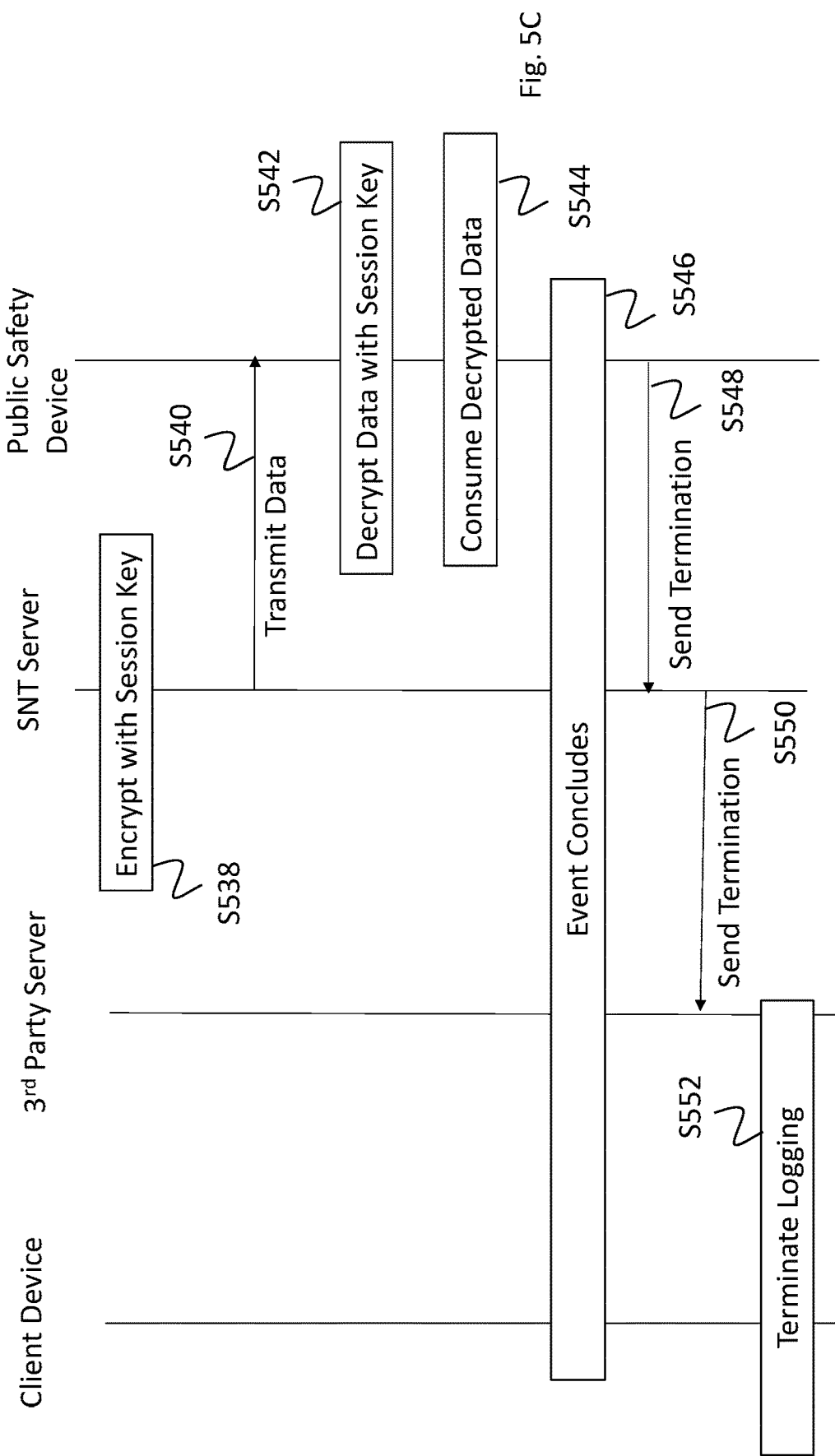

SAFETY NETWORK OF THINGS

CROSS-REFERENCE TO RELATED APPLICATIONS

This Application is a continuation (and claims the benefit of priority under 35 U.S.C. § 120) of U.S. Ser. No. 17/548,564, filed Dec. 12, 2021, entitled "SAFETY NETWORK OF THINGS," which is hereby incorporated by reference in its entirety.

BACKGROUND

Technical Field

This disclosure relates to enhancing emergency service access points with data-relaying capabilities.

Related Art

The number of Internet-enabled devices sold and deployed each year is growing at an explosive rate. These devices form the Internet of Things (IoT). Although these devices are purchased by consumers, businesses, and government agencies, they live in isolation from one another. There are many reasons why these devices are isolated from the public safety providers. For example, these devices are privately owned in many cases. The devices may also be personal in nature and only associated with a particular individual.

Given the private ownership of these devices, they are supported by a device service or provided in combination with a service provider such as Google Nest, Apple Home, or even Comcast. Given the device association with an individual's account, the data stays within the context of the account holder.

There are services that provide device location. There are services that provide IoT and data for private use.

BRIEF SUMMARY

When combined together, these devices can provide unprecedented context information for lawful uses and safety in the large.

BRIEF DESCRIPTION OF THE SEVERAL VIEWS OF THE DRAWINGS

FIG. 4 illustrates an example of a table used in particular implementations of the present disclosure.

FIGS. 5A, 5B, and 5C illustrate a signal flow according to an implementation of the present disclosure.

DETAILED DESCRIPTION

The Safety Network of Things (SNT) is a service that provides IoT data in context for lawful purposes.

Figure 1:
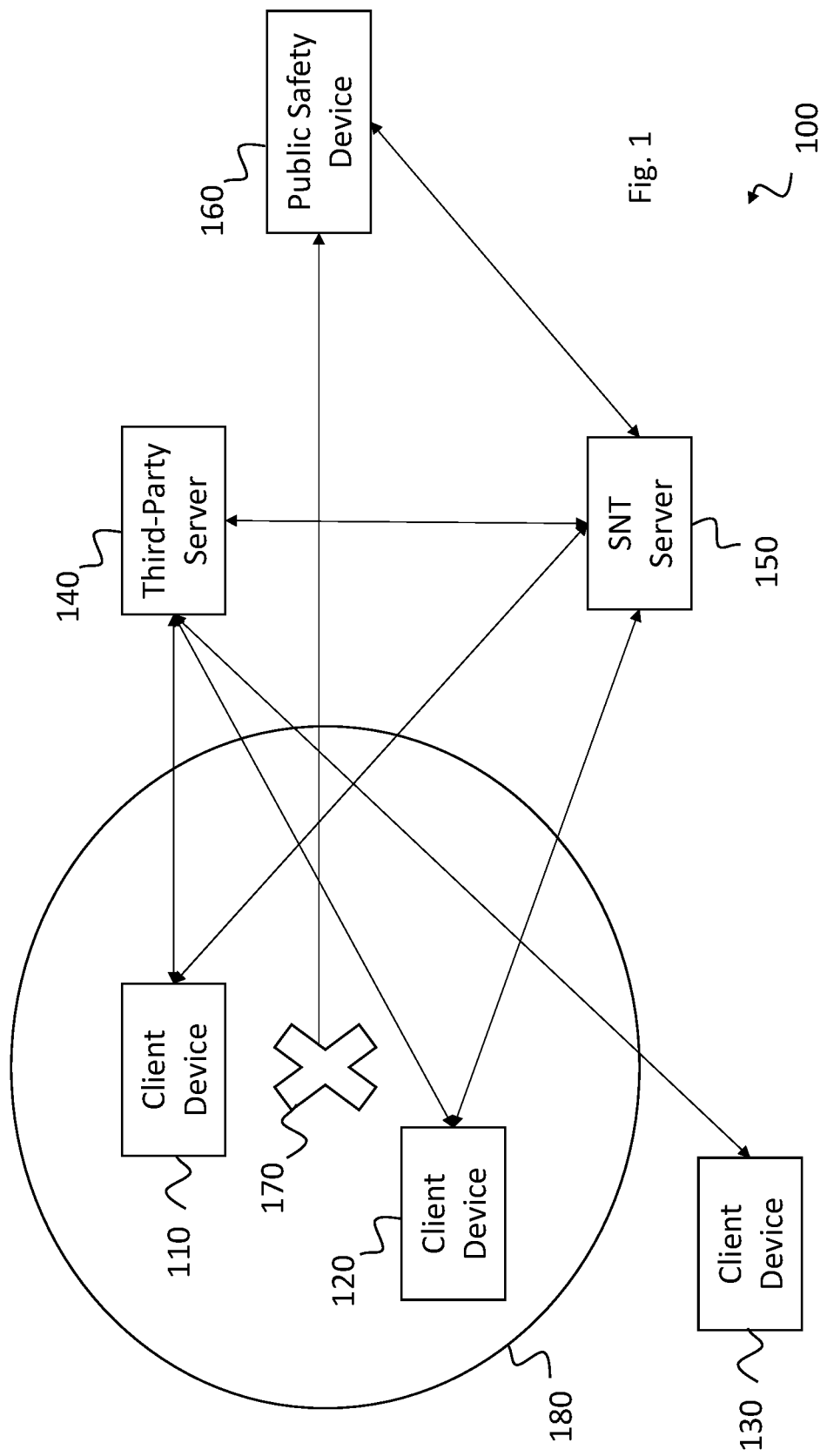
FIG. 1 illustrates a basic overview of a safety network of things system, according to an implementation of the present disclosure.

FIG. 1 illustrates a basic overview of an SNT system 100, according to an implementation of the present disclosure. The SNT includes client devices 110, 120, 130, a third-party server 140, an SNT server 150, a public safety device 160, an event location 170, and a geofence 180.

The client devices 110, 120, 130 can be smart devices, for example. As an example, the client devices 110, 120, 130 can be a Ring Camera, a Google Nest Cam, or a smartphone.

The third-party server 140 provides services for client devices 110, 120, 130. For example, the third-party server 140 can be hosted by Google, Apple, or Comcast. Although FIG. 1 illustrates a single third-party server 140 for the client devices 110, 120, 130, the SNT system 100 can include a respective third-party server for each of the client devices 110, 120, 130.

The SNT server 150 provides services for the SNT. As one example, the SNT server is operated by Intrado Corporation.

The public safety device 160 is a device operated by a lawful public safety entity, such as the police, fire brigade, or ambulance services. In some implementations, the public safety device 160 is operated by a public-safety answering point (e.g., before the services are differentiated to the police, fire brigade, or ambulance services). The public safety device 160 can also be operated by federal civilian agencies (e.g., the Federal Bureau of Investigation) or military agencies (e.g., the United States Army). In some implementations, the public safety device 160 is replaced or supplemented by a private safety device (e.g., lawfully operated by a home security provider).

The event location 170 is a location at which an event occurs. In the context of the public safety device 160, the event can be an event for which a public safety entity traditionally would be contacted (e.g., burglary, fire, or car accident).

The geofence 180 is an area surrounding the event location 180. Although illustrated as a circle, the SNT system 100 can define the geofence 180 as any shape, such as an open, boundary-only, or closed polygon; a symmetric or asymmetric polygon; a simple, star, or self-intersecting polygon; a concave or convex polygon; and so on. The geofence 180 can be defined by a natural boundary (e.g., a river), a manmade boundary (e.g., a road), or by conceptual boundaries (e.g., a county line).

In the basic overview of FIG. 1, the client devices 110, 120, 130 are purchased and installed. The client devices 110, 120, 130 contact third-party server 140 and provide, for example, a user's name, relevant billing information for the third-party server 140, an Internet address for the client device, and a corresponding physical location (e.g., a home address). The user(s) of client devices 110, 120, 130 can opt-in to participation in the SNT system 100. By opting into the SNT system 100, the user(s) of the client devices 110, 120, 130 authorize the third-party server 140 to share the information of the client devices 110, 120, 130 with the SNT server 150.

Thus, the SNT server 150 can receive, for example, a user's name, the Internet address for the client devices 110, 120, 130, and their corresponding physical locations.

An event occurs at the event location 170. Accordingly, the public safety device 160 receives an indication of the event, for example, from a bystander that calls 911. The public safety device 160 contacts the SNT server 150 to begin a session. The public safety device 160 can share the event location 170 and can define the geofence 180.

The SNT server 150 determines that client devices 110, 120 are within the geofence 180. The SNT server 150 also determines that client device 130 is outside of the geofence 180. Accordingly, data is obtained from sensors in client devices 110, 120.

In some implementations, the SNT server 150 sends a sensor data request to the client devices 110, 120, and those devices respond to the SNT server 150 with a sensor data reply including the data.

In other implementations, the SNT server 150 sends a sensor data request to the third-party server 140. In some such implementations, the third-party server 140 sends a request to client devices 110, 120 for data from the at least one sensor, and those devices respond to the third-party server 140 with the data. In other such implementations, the third-party server 140 receives the data from the client devices 110, 120 on an on-going basis. Therefore, in such implementations, the third-part server 140 might not send a request for the data to client devices 110, 120. In implementations in which the client devices 110, 120 encrypt the sensor data response, the third-party server 140 can decrypt the sensor data response to receive the data. The third-party server 140 can then encrypt the data with a first session key to produce an encrypted response and forward the encrypted response to the SNT server 150.

As an example, this data can be video data, audio data, temperature data, humidity data, carbon monoxide data, smoke data, brightness data, motion data, gyro data, or position data.

The SNT server 150 receives the encrypted response from the third-party server 140. The SNT server 150 decrypts the encrypted response using a corresponding first session key. The SNT server 150 can archive the data for later auditing. The SNT server 150 can then encrypt the data with a second session key. The SNT server 150 transmits the encrypted data to the public safety device 160.

The public safety device 160 receives the encrypted data from the SNT server 150. The public safety device 160 decrypts the encrypted data with a corresponding second session key to produce the data.

Thus, a lawful entity such as the public safety device 160 can receive information from a sensor proximate to an event, while securing the information from intrusion.

Thus, select implementations of the SNT system 100 can leverage rich sources of data from client devices 110, 120 in context to the event location 170. While other systems may operate on Geographic Information System (GIS) location, incidents happen at street intersections and addresses. Context matters, and verifiable incident location matters.

In select implementations, the SNT system 100 can use multiple levels of access, authorization, and logging to establish and maintain trust.

For example, in many implementations, the SNT system 100 can authenticate the public safety device 160 before providing access control to data from the client devices 110, 120, 130. Further, the SNT system 100 can authenticate the public safety device 160 before providing access to the client devices 110, 120, 130.

In one implementation, the public safety device 160 receives credentials from law enforcement and transmits the credentials to the SNT server 100. When the public safety device 160 requests access to the client devices 110, 120, 130 or data therefrom, the SNT system 100 can log the credentials in combination with the access. Thus, the SNT system 100 can provide audit controls and reporting about the public safety device 160 or associated credentials that access the client devices 110, 120, 130 or their data. In some implementations, the SNT server 150 can grant access from the public safety device 160 via a user experience or API in a preauthorized and secured manner.

Figure 2:
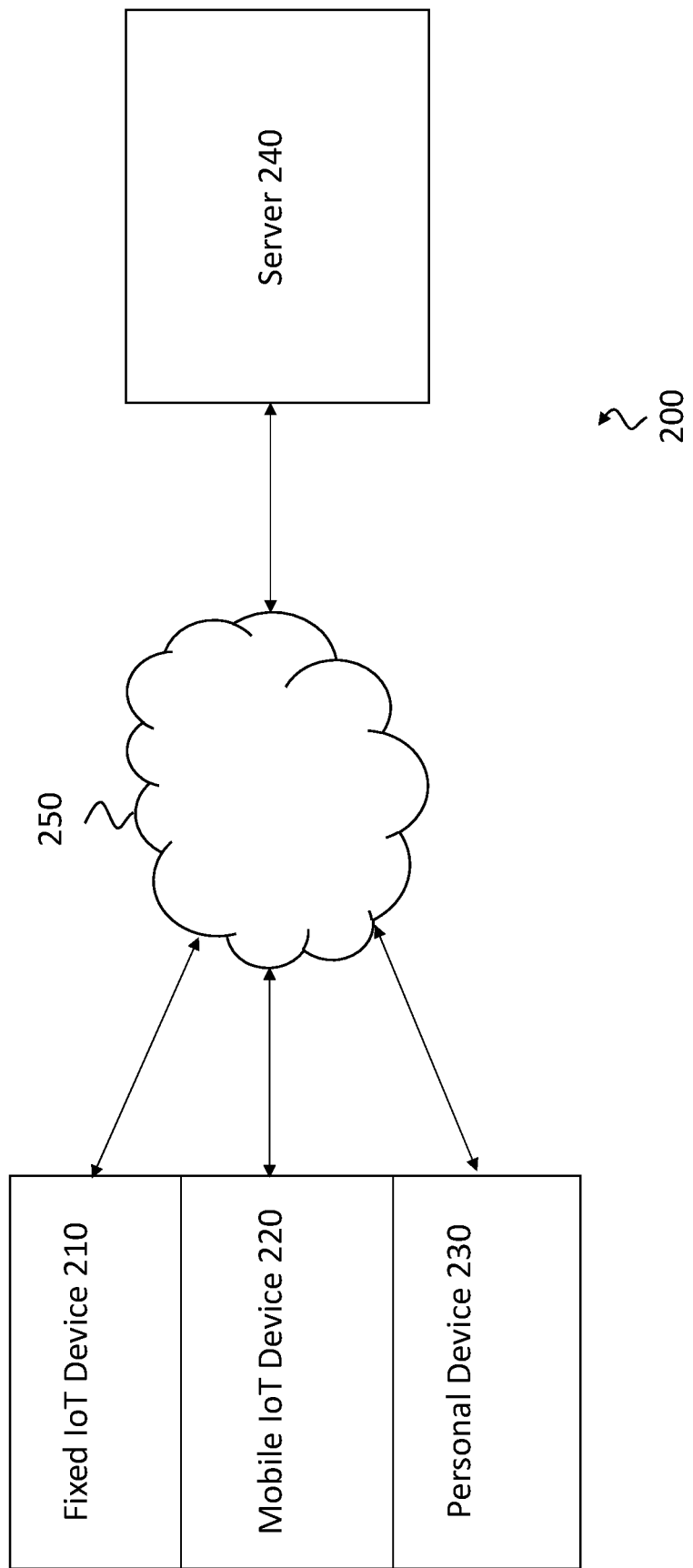
FIG. 2 illustrates a conceptual view of a safety network of things according to an implementation of the present disclosure.

FIG. 2 illustrates a conceptual view of an SNT 200, according to an implementation of the present disclosure. The SNT 200 includes a fixed IoT device 210, a mobile IoT device 220, a personal device 230, a server 240, and a cloud network 250.

The fixed IoT device 210, the mobile IoT device 220, and the personal device 230 (generally, a client device) can share some commonalities. For example, the client devices can be network-enabled devices including one or more sensors.

The fixed IoT device 210 is a device typically installed within infrastructure at a fixed position. Such a client device can be, for example, a smart doorbell, a smoke detector, or a carbon monoxide detector.

The mobile IoT device 220 is a device that moves but does not necessarily identify majority (e.g., exclusive) use or ownership by a particular individual. Such a client device can be, for example, a robot vacuum or a portable video game system.

The personal device 230 is a device that typically identifies majority use or ownership by a particular individual. Such a client device can identify the individual by virtue of an identifier (e.g., a cellular phone number, an email address, a password) or by virtue of being worn by the individual, for example. Thus, examples of the personal device 230 can include a smartphone, a smart watch, and a laptop computer.

The server 240 provides services relative to the client devices. For example, the server 240 can grant access to or from a client device, register the client device with the SNT service, grant access to a history of the client device, and/or grant access to metadata associated with the client device 110, 120, 130.

The cloud network 250 includes at least a portion of a network and can include one or more computers or network devices. As discussed later, the cloud network 250 can be wired and/or wireless and can communicate via any protocol (e.g., proprietary, open, or standardized). In many implementations, at least some aspects of the cloud network 250 use Internet protocol (IP) communications.

Some implementations of the cloud network 250 can offer one or more of the following modes: engagement, access, and interaction.

In the engagement mode, the server 240 can determine the devices within a particular geofence and establish connections to those devices. The server 240 can map the locations of the devices. In select implementations, the server 240 can make a map including the locations available via a web browser or embedded within another data stream.

In the access mode, the server 240 can perform real-time monitoring of the sensors of the devices and stream data from those sensors. In various implementations, the data from the sensors is stored for later retrieval. This retrieval can be based on event ID, event location, time/date, device ID, data hash, or associated event ID, for example. In some implementations, the server 240 can store a stream of the data, metadata of the data, or both.

In the interaction mode, the server 240 can control or actuate the client devices 210, 220, 230. In addition, in the interact mode, the server 240 can communicate through the client devices 210, 220, 230. For example, the server 240 can send a signal to turn on a respective device of the client devices 210, 220, 230. The respective client device can then use at least one of its sensors and send sensed data to server 240 over cloud network 250, for example.

In some implementations, when a consumer establishes service for the client device, the consumer can opt the client device into the SNT system 100. In select implementations, if the client device is opted into the SNT system 100, then the client device sends a registration to the server 240 over the cloud network 250.

In other implementations, if the client device is opted into the SNT system 100, then the client device sends to a server (e.g., third-party server 140) a data stream that includes a flag indicating the opt-in. Then, the third-party server 140 can send the registration to the server 240 over the cloud network 250.

The registration includes, for example, a name of the consumer and a geographical address in which the client device is installed. In some implementations, the registration includes a room in which the client device is installed. In various implementations, the room can be represented by a number or by a descriptor (such as "kitchen").

The server 240 records the registration and locates the client device on a map. In many implementations, the map is based on the GIS location.

In various implementations, the SNT system can execute periodic or on-demand re-discovery of the client devices. Thus, the server 240 can learn the current capabilities of the client devices. For example, a particular geographic location (e.g., a consumer's home) can include a network of devices. By contacting the network of devices (especially, a device like a router, desktop computer, or smartphone), the server 240 can determine the presence of newly enabled or disabled devices via the re-discovery process.

In another example, the client devices can register with the server 240 individually. Again, the server 240 can determine the available client devices via the re-discovery process. For example, if a client device fails to participate in two consecutive re-discovery processes, then the server 240 can assume the client device is not available.

In some implementations, the re-discovery includes a ping service. For example, the server 240 can ping a respective client device to determine whether the client device is up (e.g., powered-on, connected to a network, and functional) or down (e.g., powered-off, disconnected from a network, or otherwise non-functional). The server 240 can provide the ping service on-demand and/or on a schedule.

The server 240 can provide services (e.g., to public safety device 160) including a video service, an audio service, a location service, a history service, and other services.

In an example of the video service, the server 240 can provide video (or still images) from an image sensor of the client device to the public safety device 160. The server 240 can provide the video (or the still images) with or without obfuscation.

In an example of the audio service, the server 240 can provide audio from a microphone of the client device to the public safety device 160. If the client device includes a speaker, then the server can provide two-way audio between the client device and the public safety device 160.

In an example of the location service, the server 240 can provide a location of the client device or of an event to the public safety device 160. The location can be based on Global Positioning System (GPS) data of the client device. The location alternatively or additionally can be based on a provided address, such as an address provided by a consumer during registration or during an emergency call.

In an example of the history service, the server 240 can store sensor data from the client devices, location data of an event, or credentials received from the public safety device 160. Further, the server 240 can store, as history, a raw feed of data from the client device, metadata, or a package of data designated as an event. The client device or the server 240 can automatically generate the metadata, such as by including a time of reception, a location of the event (e.g., GPS coordinates), or a time of the event. In other implementations, the metadata is generated (e.g., tagged in a file) by a human. In such an implementation, the metadata generally can include tags that are more descriptive (e.g., "robbery"). Thus, the server 240 can allow the public safety device 160 (or an entity, such as an insurance company or auditor) to investigate the event later.

The server 240 can also provide other services. For example, the server 240 can permit access to other sensors in a geographic area.

Thus, the server 240 permits a device access service that provides access on the basis of discrete modes aligned with a lawful access request.

Figure 3:
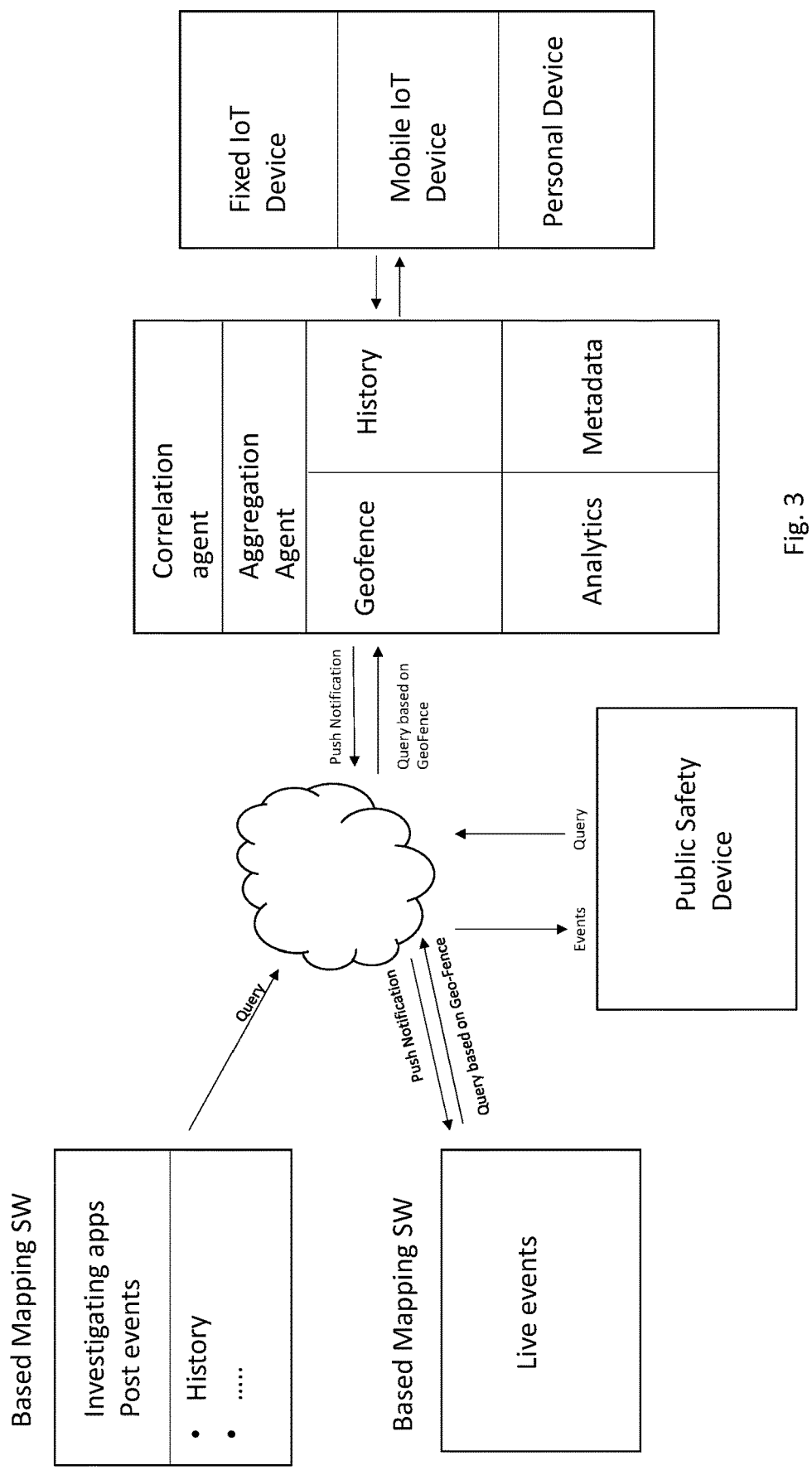
FIG. 3 illustrates a conceptual implementation of a safety network of things according to an implementation of the present disclosure.

FIG. 3 illustrates a conceptual implementation 300 of a safety network of things according to an implementation of the present disclosure. The conceptual implementation 300 includes an investigation application 310, mapping software 320, a public safety device 330, an SNT server 340, client devices 350, and network 360.

The investigation application 310 investigates applications after the conclusion of an event. For example, the investigation application 310 can send a query about an event to network 360. The investigation application 310 receives, via the network 360, a response including a history of the event. The investigation application 310 can perform the auditing operations described in this disclosure. The investigation application 310 can be implemented using mapping software.

The mapping software 320 can be a device monitoring a particular location, such as a jurisdiction. For example, this device might be controlled by an entity (e.g., an emergency service, such as a highway patrol unit or transit police) monitoring for events that occur within the jurisdiction but for which the entity might not be a primary point of contact. Thus, the mapping software 320 can transmit, via the network 360, a query based on a geofence. As illustrated in FIG. 3, the SNT server 340 receives the query via the network 360. As described later, the SNT server 340 transmits a push notification about a live event, via the network 360. The mapping software 320 receives the push notification via the network 360. Thus, the mapping software 320 can receive information about a live event occurring within its jurisdiction.

The public safety device 330 is, for example, similar to the public safety device 160. In some implementations, the public safety device 330 transmits a query over the network 36. The query can include, for example, an identification of the public safety device 330. The network 360 can deliver this query to the SNT server 340. As described later, the SNT server 340 can determine an event, based on the identification of the public safety device 330. The SNT server 340 can respond, over the network 360, with an identification of one or more events relevant to the public safety device 330. The public safety device 330 then receive, over the network 360, the identification of the one or more events from the SNT server 340.

The SNT server 340 is similar to the server 240. The SNT server 340 includes a correlation agent, an aggregation agent, a geofence, analytics, a history, and metadata. For example, the geofence is an area surrounding a location of an event. The event can be a live event, such as the event described in the push notification. The event can also be a historical event, such as the event investigated by the investigation application 310. The geofence can be any shape.

The SNT server 340 can store the event in a plurality of formats. For example, the SNT server 340 can store the geofence with the boundary used to identify client devices during the event. The SNT server 340 can store the geofence as a location of the event and with one or more variables by which a boundary can be reconstructed. Thus, the SNT server 340 can reconstruct the same boundary, as well as construct a new boundary based on changed variables (e.g., if two events initially thought to be separate were later deemed connected for some purpose).

The SNT server 340 can also store analytics relating to events. For example, the analytics can include sources of event notifications (e.g., the phone number that called a public safety access point to inform of the event), the geographic location of such a source (e.g., GPS coordinates of a mobile phone that called the public safety access point), relative locations of events in time and space, response time between initial contact with a public safety access point and an emergency service arrival at the event location, a time at which the emergency service leaves the event location, and other data.

The metadata stored by the SNT server 340 can include the aforementioned metadata, as well as other metadata.

The history stored by the SNT server 340 can include historical geofence data for events, as well as historical analytics data for events and historical metadata for events. The history can also include raw sensor data (e.g., video) from a client device for events.

The aggregation agent sits on top of the geofence, analytics, history, and metadata. That is, the aggregation agent can aggregate those data sources for correlation by the correlation agent.

The correlation agent sits on top of the aggregation unit. The correlation agent can determine relationships between the data sources. For example, the correlation unit can determine, based on the call source, that the same phone number has reported several improper events. The correlation unit can determine, based on the relative locations, that several events have occurred in a particular neighborhood development in the last few weeks.

The SNT server 340 interacts with the client devices 350. Although illustrated as a monolithic device, the client devices 350 are individual devices respectively similar to fixed IoT device 210, mobile IoT device 220, and personal device 230. As discussed later, the client devices 350 can transmit registration requests and sensor data, among other data, received by the SNT server 340. Further, the SNT server 340 can transmit pings, a key, and termination requests, among other data, received by the client devices 350.

As discussed previously, the SNT server 340 receives the query based on the geofence from the mapping software 320. The SNT server 340 can determine whether the geofence includes any locations at which an ongoing event is present. Similarly, the SNT server 340 can determine whether the geofence overlaps any locations in a geofence of an ongoing event. Thus, the SNT server 340 can determine whether the jurisdiction monitored by the mapping software 320 includes any events. Further, the SNT server 340 can determine whether the jurisdiction monitored by the mapping software 320 is adjacent to any events.

The SNT server 340 then can produce a push notification, based on the location of the events. For example, the push notification can include the location of events in the geofence received from the mapping software 320. The push notification can alternatively or additionally include locations within that geofence that overlap with a geofence of an active event.

The push notification can also include other data associated with the event, such as an identification of dispatched emergency services or an identification of the jurisdiction in which the event is occurring (particularly when the event is not located within the jurisdiction monitored by the mapping software 320).

The SNT server 340 then transmits the push notification via the network 360.

As also described previously, the SNT server 340 can determine an event, based on the identification of the public safety device 330. For example, the SNT server 340 can maintain a registry of jurisdictions monitored by various public safety services. For example, a suburb outside of a major metropolitan area might be monitored by a police department for the metropolitan area but monitored by its own fire department. Thus, upon receiving an identification of the public safety device 330, the SNT server 340 can determine the area monitored by the public safety device 330 (e.g., the suburb, in the case of the fire department). The SNT server 340 can then determine if there are any events occurring within the area (e.g., suburb) or if geofences of other events overlap the area (e.g., if the event occurs on the outskirts of the metropolitan area).

Accordingly, the SNT server 340 can transmit an identification of such events that is received by the public safety device 330.

FIG. 4 illustrates an example of a table used in particular implementations of the present disclosure. In the example illustrated in FIG. 4, the table includes three entries.

The first entry is for an event occurring at 1234 Mass Ave on Feb. 1, 2015, at 10:00 AM. The geofence established for this event is 500 feet. A device that has registered with the SNT is located within the geofence and has been assigned a device ID of 2412. Thus, the SNT can use the device with device ID 2412 to receive data about the event. The data provided by the device has been hashed to produce a hash value of 0xEF34. The entry stores the hash value of the data to provide auditing features. For example, in an insurance claim, if a party asserts that a data file has been received from the device, then the hash of that data file should also be 0xEF34.

The second entry is for an event occurring at 1 Card Drive on Feb. 1, 2015, at 10:15 am. A geofence of 1000 feet has been established for this event. A device that has registered with the SNT is located within the geofence and has been assigned a device ID of 4551. Thus, the SNT can use the device with device ID 4551 to receive data about the event. The data provided by the device has been hashed to produce the hash value 0x2424.

The third entry is for an event occurring at 1217 Mass Ave on Feb. 1, 2015, at 10:30 am. A geofence of 400 feet has been established for this event. A device that has registered with the SNT is located within the geofence and has been assigned a device ID of 5644. Thus, the SNT can use the device with device ID 5644 to receive data about the event. The data provided by the device has been hashed to produce the hash value 0xBE12.

The associated event IDs column indicates that event ID 1003 has been associated with event ID 1001 and that event ID 1001 has been associated with event ID 1003. The SNT server can associate event ID 1001 with event ID 1003, based on a determination that the geofences for the two events and the times and dates of the events overlap. In other words, the events occurred at almost the same time in almost the same location. Thus, a correlation can be implied.

In some implementations, an association between the geofences and times and dates is not limited to overlapping. For example, the SNT server can associate events based on proximity, such as within a percentage of the geofence area (e.g., 10% or less).

The SNT server can also associate events based on metadata taken from sensors. For example, the SNT server can perform optical character recognition (OCR) on video data to recognize an automobile license tag in a first event (e.g., a carjacking). The SNT server can store the automobile license tag in the system or in a row of the table of FIG. 4 for the first event.

The SNT server again performs OCR during a second event (e.g., failure to pay a highway toll). The SNT server recognizes the automobile license tag and stores the tag in the system or in a row of the table of FIG. 4 for the second event. Then, the SNT server can determine the same automobile license tag is involved in both the first event and the second event. Accordingly, the SNT server can associate the first and second events by referencing the second event in the associated event IDs cell of the first event. Of course, the SNT server additionally or alternatively can reference the first event in the associated event IDs cell of the second event.

Additionally, some implementations permit a user input for the associated event IDs cells. For example, a police department might learn that two events were associated in the real world, based on an investigation into the events. Thus, in select implementations, a user can modify the associated event ID cell to create an association between the two events. Thus, the police department (and other entities, such as an insurance company) can consider the information of the two events together.

Figure 5A:
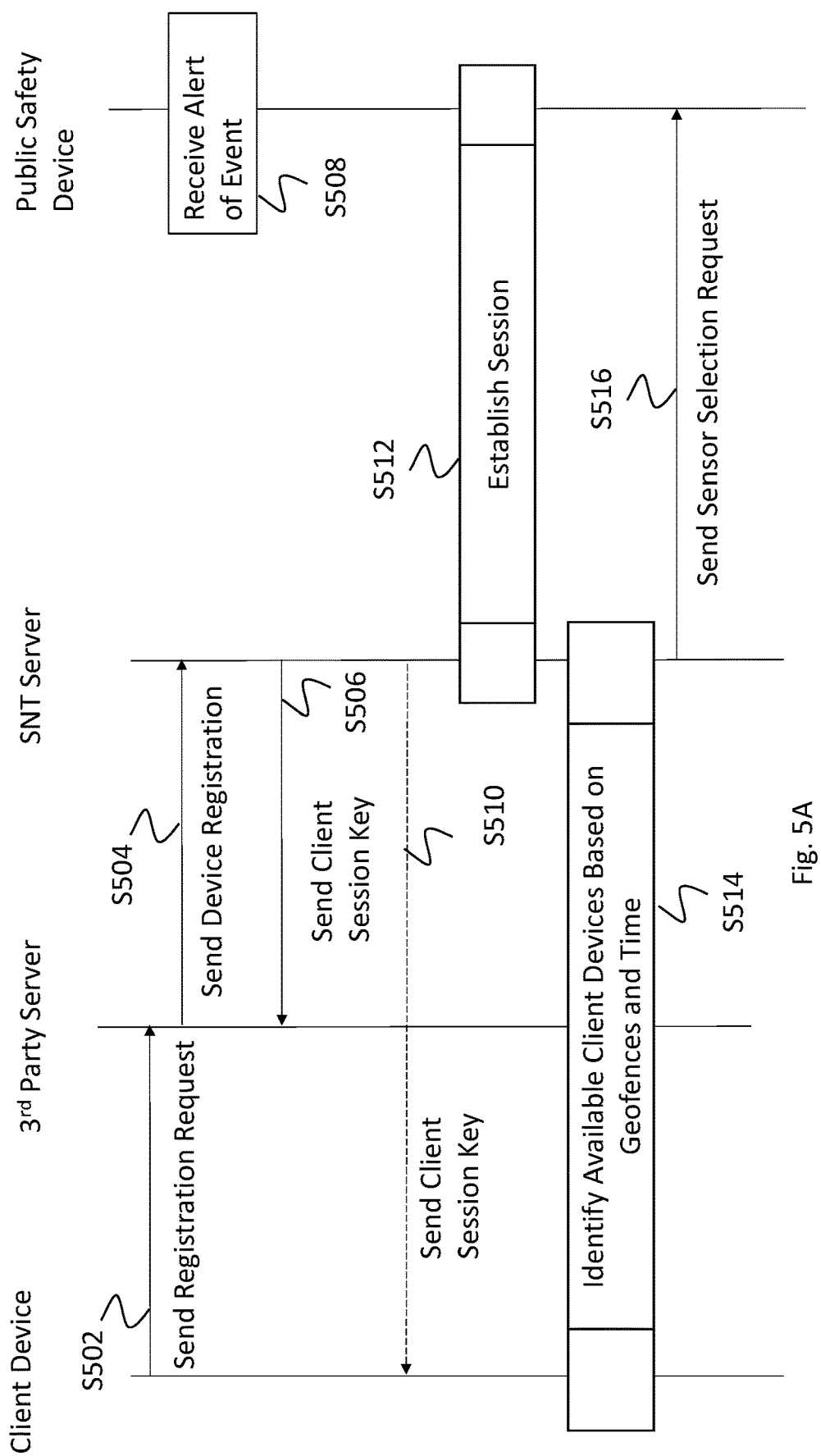
Figure 5B:
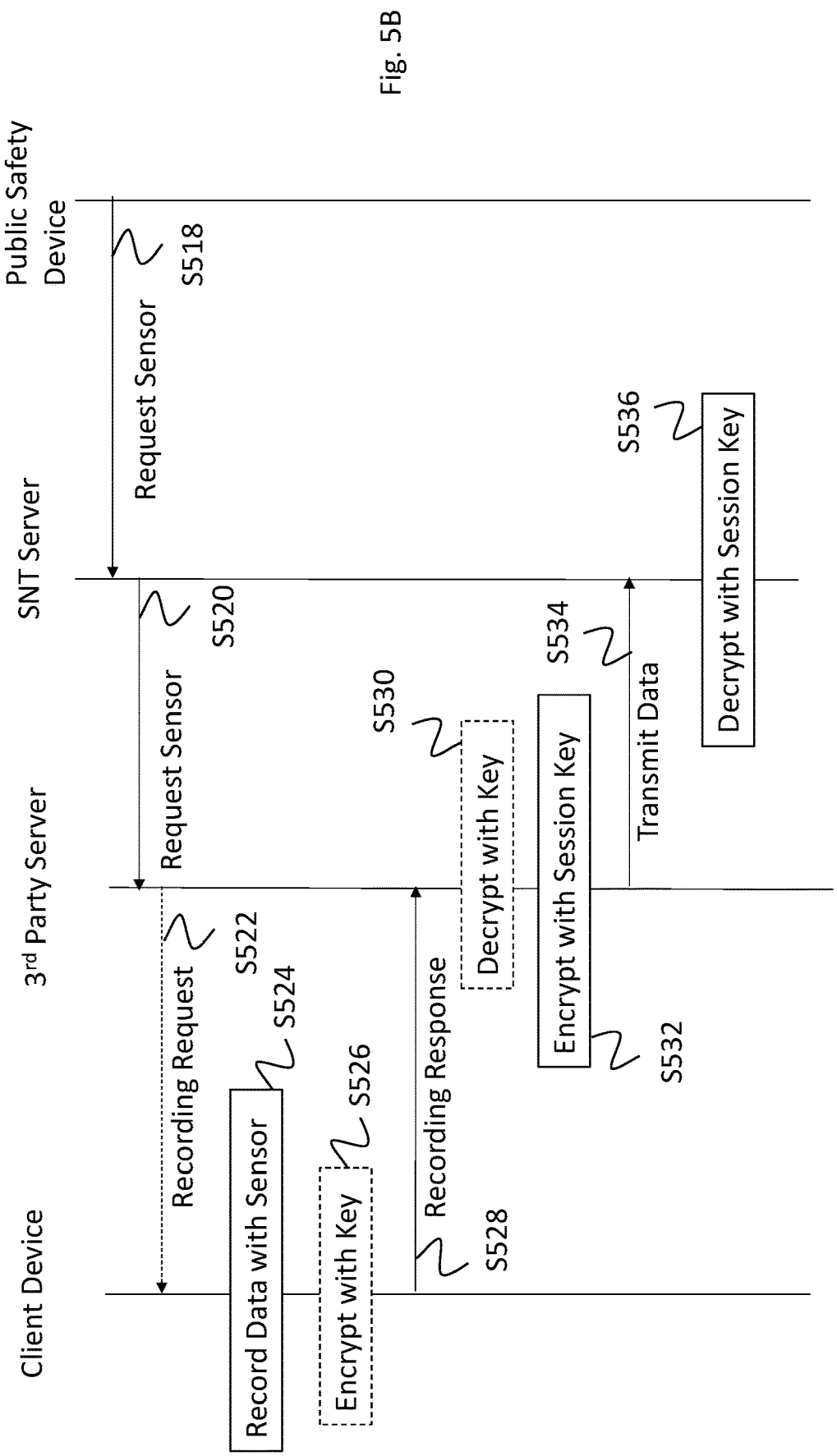

FIGS. 5A, 5B, 5C illustrates a signal flow according to an implementation of the present disclosure.

The flowchart begins at S502 in which a registration request is sent to a third-party server. The registration request includes a device ID, a device Internet address, and a physical location of the device. The device ID is, for example, an identification assigned to the device at a time of its manufacture. In some implementations, the device ID can identify the specific device or a product line to which the device ID belongs. Thus, in many implementations, the device ID can identify a sensor included in the client device. The device Internet address can be, for example, an internet protocol (IP) address or a media access control (MAC) address associated with the client device. The physical address of the client device can be entered by a user, located via GPS or cellular triangulation, assumed via IP address, or otherwise assumed by virtue of connecting through devices with known locations (e.g., via a telephone line). In select implementations, the physical address can identify a room by name (e.g., "kitchen" or "basement") or number (including, but not limited to, an apartment or suite number).

In the implementation illustrated in FIG. 5A, the registration request is sent by the client device itself. In other implementations, a different device sends the registration request. For example, a consumer (e.g., a human user) can register the client device using a smartphone, laptop computer, or desktop computer. In one such implementation, the consumer can use a camera of a smartphone to optically read a serial number or QR code from the client device. In another such implementation, the consumer types a serial number of the client device into the smartphone. In yet another implementation, the consumer can establish communication between the two devices using the Bluetooth standard (previously Institute of Electrical and Electronics Engineers (IEEE) 802.15.1) or near-field communication (e.g., complying with ISO (International Organization for Standardization)/IEC (International Electrotechnical Commission) 18092/ECMA-34, ISO/IEC 21481/ECMA-352, ISO/IEC 14443 and/or FeliCa). Other technologies can be used, as well. In such a context, the device that sends the request can be considered an extension of the client device.

Thus, the consumer has opted-in to the SNT system.

In S504, the third-party server sends a device registration received by the SNT server. The device registration sent in S504 can include the device ID, the device Internet address, an identification of a sensor in the client device, and the physical address of the client device. That is, in many implementations, the device registration in S504 supplements the registration request in S502 with an identification of a sensor in the client device. This consideration permits the third-party server to inform the SNT server of a capability of the client device.

In some implementations, the device registration includes an identification of the third-party server. Thus, the SNT server can identify a third-party server by which to contact the client device.

The SNT server can store the device registration. In addition, the SNT server can generate or otherwise retrieve a session key to be used in communication with the SNT server. In some implementations, the session key is symmetric. In many implementations, the session key is asymmetric. In a particular implementation involving an asymmetric key, the session key is a public key for the SNT server. In various implementations, the SNT server can associate the device ID with the session key.

In S506, the SNT server transmits the session key received by the third-party server. In some implementations, the third-party transmits the session key for reception by the client device.

In implementations in which the SNT server can bypass the third-party server in communicating with the client device, the SNT server can instead transmit the session key to the client device in an encryption request received in S510.

In S508, the public safety device receives an alert indicating the occurrence of an event. For example, a pedestrian can call 911 on a mobile telephone to reach a public safety access point that operates the public safety device. During the call, an operator at the public safety access point can receive information regarding a location of an event. A clock at the public safety access point provides a time. The operator can request information from the pedestrian regarding a perimeter for the event. For example, the operator can ask if the event is contained (e.g., an isolated traffic collision) or if the event is not contained (e.g., a fire that has spread from one house to another).

Thus, the alert can include a time, a location, and a distance from the location. The time can begin at a time at which the public safety device receives the alert. The time alternatively can be a time at which the event began (i.e., before the event occurs) or a time at which the event was first noticed. The location can be any physical location, such as an address, GPS coordinates, a street intersection, a building name, or a landmark. The distance can be based on information received from the pedestrian.

In S512, the public safety device sends a session request to be received by the SNT server to establish a session. The session request can include the location of the event, the distance from the event, the time of the event and an identifier of the public safety device. In particular, the public safety device and the SNT server determine an event ID for the event, one or more geofences for the event, and a public safety session key.

In some implementations, the public safety device determines the event ID and transmits the event ID to the SNT server. In other implementations, the SNT server determines the event ID to centralize the event ID assignments, thereby avoiding a conflict with an event ID determined by a different public safety device. Such an implementation can avoid incompatibility with another public safety device in an example in which multiple public safety devices request SNT information for the same event (e.g., if an event spans jurisdictional boundaries or involves multiple emergency services).

The SNT server can determine one or more geofences for the event, based on the location of the event and the distance from the location. For example, the SNT server can set a first geofence that identifies the jurisdiction in which the event is occurring. Such a geofence is typically based on jurisdictional or political boundaries, rather than a geometrical distance. That is, the SNT server can access a specialized database that determines an emergency services jurisdiction of a specified location. A skilled artisan would recognize such a database might be regulated by the Federal Communications Commission. One such database is operated by Intrado Corporation of Omaha, Neb. Thus, the SNT server can determine whether the event is occurring in the first geofence, based on the identifier of the public safety device.

The SNT server can also determine a second geofence to geometrically define client devices near the location of the event. Such a geofence can be defined by a distance. In some implementations, this distance is inversely proportional to the population density in the location. Thus, the second geofence can be larger in rural areas with a lower population density that might have fewer client devices within an area. In contrast, the second geofence can be smaller in urban areas with a higher population density in which an area might have more client devices, as well as more obstruction.

In select implementations, the SNT server can determine a third geofence that identifies emergency service jurisdictions adjacent to the jurisdiction determined for the first geofence. Thus, the SNT server can notify emergency services that might be affected, particularly in situations in which the location of the event is close to a border with the adjacent jurisdiction or when a specialized jurisdiction might be implicated (e.g., highway patrol or public transit police).

In many implementations, the SNT server maps the first, second, and/or third geofences and sends data representing the geofences to the public safety device. One example of such data is an interactive map illustrating these locations. Thus, the public safety device can modify the geofences and transmit the modifications to the SNT server.

In other implementations, the public safety device proposes one or more geofences to the SNT server. The SNT server can then correct or otherwise adjust these geofences based on its specialized database, for example. The SNT server can then transmit the corrections or adjustments to the public safety device.

The SNT server also establishes a public safety session key with the public safety device. In some implementations, the public safety session key is symmetric. In many implementations, the public safety session key is asymmetric. In some such implementations, the public safety session key is a public key of the SNT server. In select implementations, the public safety session key is the same as the client session key. In other implementations, the public safety session key differs from the client session key.

The SNT server and the public safety device also establish a time for the event. In many implementations, the time is the time of the event received in S508. In other implementations, the time is a time at which the public safety device contacted the SNT server.

In S514, the client device, the third-party server, and/or the SNT server can identify available client devices, based on the geofences and the time. For example, the SNT server can determine whether the address of the client device received in S504 is located within one of the geofences (and, in many implementations, the second geofence) described previously.

This determination can also be made by transmitting a location request from the SNT server to the client device, particularly in implementations in which the client device is mobile. For example, in an implementation in which the client device is a smartphone, the SNT server can transmit a request to the client device, if the registered location of the client device is within one of the geofences. The client device can send a response to such a request where the response includes current or past coordinates of the client device.

In other such implementations, the SNT server can transmit a request for a location of the client device to the third-party server. In one such implementation, the client device is again a smartphone, and the third-party server is operated by a mobile phone provider, such as Verizon Communications Inc. of New York City, NY The third-party server can determine a location of the client device at the time of the event. Thus, the third-party server can transmit a response to the SNT server, where the response indicates the location of the client device.

In some implementations, this identification can be based on a time, particularly if the event has concluded. In such a situation, the SNT server can determine whether it received data from the client device during the event. Similarly, the third-party server can determine whether it received data from the client device during the event. In some implementations, the client device itself can determine whether it recorded data during the event, particularly if the data is stored in a local memory (e.g., a cache) and has not yet been transmitted to the third-party server or the SNT server.

Based on the client devices identified in S514, the SNT server can determine or receive information indicating one or more sensors (e.g., the capabilities) of the client device. In some implementations, the client device itself transmits its capabilities at the time to the third-party server and/or the SNT server. In such an implementation, the client device can accurately reflect the availability of its sensors, for example, if a sensor is broken or if an additional sensor has been installed. This additional installation can be common, particularly if the client device is considered an extension of a smartphone or home computer. In other implementations, the third-party server can transmit an identification of the sensors of the client device, for example, if the third-party has updated the drivers or has developed additional drivers for the client device. In yet other implementations, the SNT server can determine the sensors of the client device based on the identification of the one or more sensors received in S504.

In S516, the SNT server transmits a sensor selection request to be received by the public safety device. The sensor selection request includes an identification of the available sensors in one or more geofences, locations of the available sensors, and distances of the available sensors from the event. The identification of the available sensors can include a device ID for a client device including the sensor. Thus, a display of the public safety device can display the locations of the sensors on a map, particularly in relation to the location of the event. Accordingly, in many implementations, a user of the public safety device can understand what capabilities are available at what locations and at what distances. Thus, the user of the public safety device can see, for example, whether the SNT system can provide data from a smoke detector in a neighboring apartment. Similarly, the user of the public safety device can determine whether a doorbell camera is in a suitable range that could capture video of a fugitive in a neighborhood.

Based on this information, the user of the public safety device can cause the public safety device to transmit a sensor selection response in S518 to be received by the SNT server. For example, the user of the public safety device can drag a mouse and click a button to select on a representation of a sensor displayed on a map. Of course, any other suitable input can be used.

Thus, the sensor selection response identifies the selected client device to the SNT server. In many implementations, the request includes the device ID. In other implementations, the request identifies a location of the sensor.

Accordingly, the SNT server receives the sensor request and can determine the client device to be contacted. For example, the SNT server can determine the client device, based on the location of the device. In other implementations, the SNT server can determine the client device, based on the device ID received in S518.

The SNT server can then determine how to contact the client device. For example, the SNT server can determine the device Internet address of the client device received in S504. Thus, on some implementations, the SNT server can bypass the third-party server in S520 and send a recording request to the client device.

In some implementations, the SNT server determines the third-party server by which to contact the client device, for example, based on an identifier of the third-party server received in S504. In such an implementation, the SNT server can send a request to the third-party server as in S520. This request can include the device ID.

In implementations in which the third-party server receives the sensor request in S520, the third-party server can determine whether to forward the request to the client device. For example, in some implementations, the client device might already be sending data from the sensor to the third-party server. In such an implementation, the third-party server can determine not to forward the request to the client device. In other implementations, the client device might not be sending data from the sensor, for example, to reduce power and/or bandwidth consumption. In such an implementation, the third-party server can determine to forward the request to the client device, for example, based on the device Internet address received in S502. Thus, the third-party server can transmit a recording request in S522 to be received by the client device.

The recording request can identify the sensor of the client device requested by the public safety device in S518. Thus, if the client device includes more than one sensor, the client device can determine which sensor to activate.

In some implementations, the client device includes a motor that controls a position or orientation of the sensor. In one such implementation, the request for the sensor in S518 can include one or more motor commands for changing the position and/or orientation of the sensor. The SNT server can transmit the motor command to the third-party server (or to the client device) in S520. In select implementations, the third-party server can transmit the motor command to the client device in S522. Thus, the operator of the public safety device can ensure the relevance of data from the client device. For example, the operator of the public safety device can pivot a camera of the client device for a better view of an event.

In S524, the client device records data with the sensor. As discussed previously, the client device records the data on-demand, such as in response to a recording request. In some implementations, the client device generally streams data from the sensor at all times (e.g., a smart speaker that records audio).

In S526, the client device optionally encrypts the data. In some implementations, the client device encrypts the data with the client session key provided by the SNT server in S510. In other implementations, the client device encrypts the data with a key shared between the client device and the third-party server. Thus, the SNT system can maintain compatibility with legacy systems that might not modify the key used by the client device. In still other implementations, the client device does not encrypt the data. Thus, the SNT system can maintain compatibility with legacy systems in which, for example, the client device is a particularly low-powered device for which encryption is not a realistic expectation.

The client device then transmits the data to the third-party server in S528. As discussed above, this data can be encrypted. In some implementations, the client device bypasses the third-party server and transmits the data to the SNT server. Again, this data can be encrypted.

In the implementation illustrated in FIG. 5B, the third-party server optionally can decrypt the data in S530. For example, the third-party server might decrypt the data using a key shared between the client device and the third-party server.

The third-party server can proceed in a conventional manner regarding this data. For example, the third-party server can back-up this data for its own purposes.

The third-party server can then encrypt the data using the client session key received in S506. Such encryption can increase security, particularly in situations in which the client device did not encrypt the data.

In S534, the third-party server can transmit the encrypted data to be received by the SNT server.

In S536, the SNT server can decrypt the data received in S534. For example, the SNT server can decrypt the data using a private key of the SNT server. In other implementations, the SNT server decrypts the data using a suitable key, such as a symmetric key. The SNT server can then store the data in a memory. In some implementations, the SNT server can hash the data and store the hash in a table, such as the one illustrated in FIG. 4. Thus, the SNT server can access the data in an auditing operation.

In S538, the SNT server encrypts the data with the public safety session key. In one such implementation, the SNT server encrypts the data with a private key of the SNT server. In another implementation, the SNT server encrypts the data with a symmetric key.

The SNT server can then transmit the encrypted data in S540 to be received by the public safety device.

In S542, the public safety device decrypts the data with the public safety session key. For example, the public safety device can decrypt the data with a public key of the SNT server. In other implementations, the public safety device can decrypt the data with a symmetric key.

In S544, the public safety device can consume the decrypted data. For example, the public safety device can display video data, if the sensor of the client device was a camera. If the sensor of the client device was a microphone, then the public safety device can output audio data using headphones or a speaker. If the sensor of the client device was a carbon monoxide detector, then the public safety device can output an indication of the carbon monoxide level. The operator of the public safety device can send additional commands to control, e.g., the motor of the client device. Thus, the operator of the public safety device can track, e.g., a person walking away from an event by changing the position and/or orientation of the camera.

In S546, the event concludes. Typically, the conclusion of the event is dictated by emergency personnel at the location of the event. Thus, the emergency personnel can inform the operator of the public safety device of the conclusion of the event.

Therefore, in S548, the public safety device can transmit a termination request to be received by the SNT server. The termination request includes the event ID. In some implementations, the termination request can also include the device ID of the client device.

In S550, the SNT server determines devices to be informed of the conclusion of the event. For example, the SNT server can determine each of the client device IDs associated with the event ID. The SNT server can then determine the third-party server based on one of the device IDs.

In S550, the SNT server transmits a termination request to be received by the third-party server.

The third-party server can then determine whether to terminate the logging from the client device. In some implementations, the third-party server continues to receive data from the client device without forwarding the data to the SNT server (e.g., if the client device is a smart speaker). In other implementations, the third-party server sends a termination request to the client device in S552.

In various implementations, the SNT server bypasses the third-party server in S550 to transmit the termination request to the client device.

Client Device Override

As discussed above, in some implementations, the client device can communicate with both the third-party server and the SNT server. If the third-party server is unaware of an event, then interactions initiated by the third-party server might be at odds with the SNT system. Thus, in some implementations, the SNT server can override operations of the client device.

For example, the third-party server can transmit an override request to an Internet address of the client device. The override request can include an Internet address of the SNT server. In addition, the override request can include a server key (e.g., the SNT server's public key). Thus, based on the override request, the client device can encrypt data using the server key and transmit the data to the SNT server.

Thus, in select implementations, the client device encrypts data using a key of the third-party server and sends the encrypted data to an address of the third-party server. Further, in some such implementations, in response to receipt of the override request, the client device instead encrypts the data using the server key (e.g., of the SNT server) and transmits the data to the SNT server.

In addition, in some implementations, the third-party server can transmit a command to control a motor of the client device, thereby changing a position and/or orientation of a sensor of the client device. In a subset of such implementations, the SNT server can transmit a command to control the motor of the client device. In such a scenario, the client device can ignore the motor control command from the third-party server and perform the motor control command from the SNT server.

In response to receipt of the termination request, the client device can terminate the client device override. Thus, based on receipt of the termination request, the client device can again encrypt the data using the key of the third-party server and send the encrypted data to the address of the third-party server. Further, based on the receipt of the termination request, the processing unit of the client device can control a position and/or orientation of the sensor based on the motor control command from the third-party server.

Modifications

The sensors described herein can include image sensors (e.g., cameras and video cameras) and audio sensors (e.g., microphones). The sensors can also include hygrometers, light or brightness detectors, smoke detectors, carbon monoxide detectors, accelerometers, levels, altitude detectors, or any other sensor.

In various implementations, specific capabilities of the client device are selected. This selection can reduce power consumption, because the client device does not consume power processing sensor data that is not germane to an event. Further, this selection can assuage privacy concerns regarding the client device sharing an excessive amount of data.

In various implementations, the consumer, the law enforcement agency, or the service provider supporting the service can pay a registration fee for the SNT.

The workflow is a flexible solution used to sequence activities (services) per service type or event type.

In some implementations, the SNT system 100 includes a subscription management server. The subscription management server can provide a model and/or a mechanism for charging for and authorizing use of particular services. One such service is access involving the client devices 110, 120, 130. For example, the subscription management server can grant access to the client devices 110, 120, 130 from other components of the SNT system 100, such as public safety device 160. In addition or alternatively, the subscription management server can grant access from the client devices 110, 120, 130 to other components of the SNT system 100, such as public safety device 160.

The subscription management server can also charge a fee for registering the client devices 110, 120, 130 with the SNT service 100. In some implementations, the subscription management server charges the fee to the owners of the client devices 110, 120, 130. In other implementations, the subscription management server charges fees to the operator of the third-party server or the operator of the public safety device.

Figure 6:
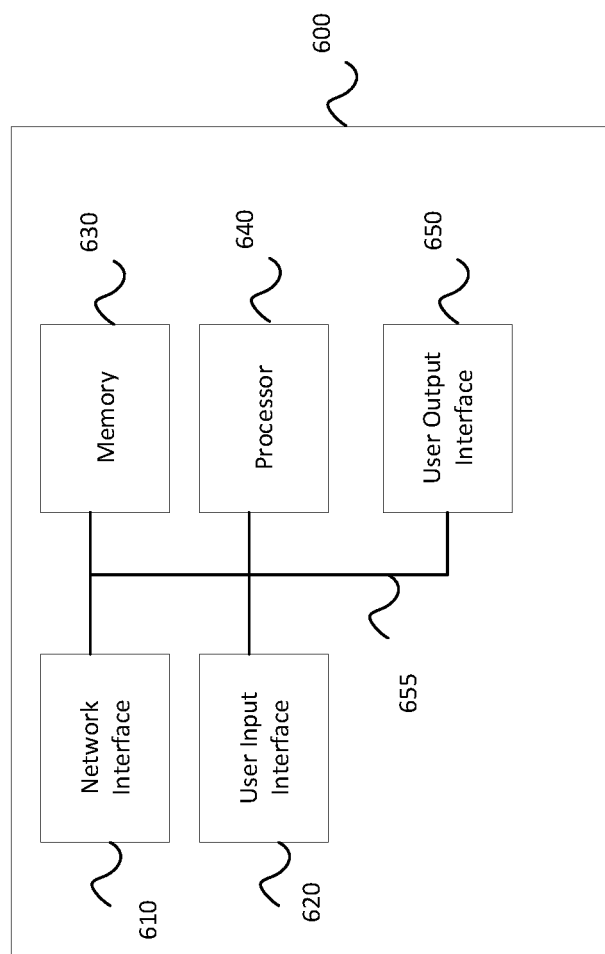
FIG. 6 illustrates a computing device, according to an implementation of the present disclosure.

FIG. 6 illustrates a computing device 600, according to an implementation of the present disclosure. The client device, the third party server, the SNT server, and the public safety device can be or include a computing device, as shown in FIG. 6.

Although illustrated within a single housing, the computing device 600 can be distributed across plural housings or sub-systems that cooperate in executing program instructions. In some implementations, the computing device 600 can include one or more blade server devices, standalone server devices, desktop computers, personal computers, routers, hubs, switches, bridges, firewall devices, intrusion detection devices, mainframe computers, network-attached storage devices, smartphones and other mobile telephones, smartspeakers, and other types of computing devices. The system hardware can be configured according to any computer architecture, such as a Symmetric Multi-Processing (SMP) architecture or a Non-Uniform Memory Access (NUMA) architecture.

The computing device 600 can include a network interface 610 that provides one or more communication connections and/or one or more devices that allow for communication between the computing device 600 and other computing systems (not shown) over a communication network or collection of networks (not shown) or the air. The network interface can communicate using near-field communications (NFC), Wi-Fi™, Bluetooth, Ethernet, facsimile, or any other wired or wireless interface.

The computing device 600 can also include a user input interface 620 that receives inputs from a human. The user input interface can be or include a mouse, a touchpad, a keyboard, a touchscreen, a trackball, a camera, a microphone, a joystick, a game controller, a scanner, or any other input device.

The computing device 600 can include a memory 630, also termed a "storage." The memory 630 can include or be one or more computer-readable storage media readable by a processor 640 and that store software. The memory 630 can be implemented as one storage device and can also be implemented across multiple co-located or distributed storage devices or sub-systems. The memory 630 can include additional elements, such as a memory controller, that communicate with the processor 640. The memory 630 can also include storage devices and/or sub-systems on which data and/or instructions are stored. The computing device 600 can access one or more storage resources to access information to carry out any of the processes indicated in this disclosure and, in particular, FIGS. 5A, 5B, and 5C.

The memory 630 can be or include a read-only memory (ROM), a programmable ROM (PROM), an erasable PROM (EPROM), an electrically erasable PROM (EEPROM), a random-access memory (RAM), a dynamic RAM (DRAM), a static RAM (SRAM), a hard drive, a cache memory, a flash memory, a removable disk, or a tape reel. The memory 630 can be or include resistive RAM (RRAM) or a magnetoresistive RAM (MRAM).

Software stored in memory 630 can include routines for at least partially performing at least one of the operations illustrated in FIGS. 5A, 5B, and 5C and can be implemented in program instructions. Further, the software, when executed by the computing device 600 in general or the processor 640 specifically, can direct, among other functions, the computing device 600 or the processor 640 to realize a safety network of things as described herein.

The computing device 600 can include a processor 640. The processor 640 can be or include one or more hardware processors and/or other circuitry that retrieve and execute software from the memory 630. The processor 640 can be implemented within one processing device, chip, or package and can also be distributed across multiple processing devices, chips, packages, or sub-systems that cooperate in executing program instructions. In some implementations, the processor 640 is or includes a Graphics Processing Unit (GPU). The GPU can benefit the visual/image processing in the computing device 600. The GPU, or any second-order processing element independent from the processor 640 dedicated to processing imagery and other perception data in real or near real-time, can provide a benefit.

The processor 640 can have any register size, such as a 32-bit register or a 64-bit register, among others. The processor 640 can include multiple cores. Implementations of the processor 640 are not limited to any particular number of threads. The processor 640 can be fabricated by any process technology, such as 14 nm process technology.

The computing device 600 can also include a user output interface 650 that outputs information to a human user. The user output interface 650 can be or include a display (e.g., a screen), a touchscreen, speakers, a printer, or a haptic feedback unit.

The computing device 600 includes a communication bus by which components of the computing device 600 (e.g., network interface 610, user-input interface 620, memory 630, processor 640, and user output interface 650) communicate.

In implementations where the client device, third-party server, SNT server, and/or public safety device includes multiple computing devices, a server of the system or, in a serverless implementation, a peer can use one or more communications networks that facilitate communication among the computing devices. For example, the one or more communications networks can include or be a local area network (LAN) or wide area network (WAN) that facilitate communication among the computing devices. One or more direct communication links can be included between the computing devices. In addition, in some cases, the computing devices can be installed at geographically distributed locations. In other cases, the multiple computing devices can be installed at one geographic location, such as a server farm or an office.

As used herein, the terms "storage medium," "computer-readable medium," or "computer-readable storage medium" can refer to a non-transitory storage medium, such as a hard drive, a memory chip, and cache memory, and to a transitory storage medium, such as a carrier wave or a propagating signal.

Aspects of the system for a safety network of things can be implemented in various manners (e.g., as a method, a system, a computer program product, or a computer-readable medium). Accordingly, aspects of the present disclosure can take the form of a hardware implementation, a software implementation (including firmware, resident software, or micro-code) or an implementation combining software and hardware aspects that can generally be referred to herein as a "circuit," "module" or "system." Functions described in this disclosure can be implemented as an algorithm executed by one or more hardware processing units, e.g., one or more microprocessors of one or more computers. In various embodiments, different operations and portions of the operations of the methods described can be performed by different processing units. Furthermore, aspects of the present disclosure can take the form of a computer program product embodied in one or more computer-readable media having computer-readable program code embodied, e.g., encoded or stored, thereon. In various implementations, such a computer program can, for example, be downloaded (or updated) to existing devices and systems or be stored upon manufacturing of these devices and systems.

The detailed description presents various descriptions of specific implementations. The innovations described can be implemented in a multitude of different ways, for example, as defined and covered by the claims and/or select examples. In the description, reference is made to the drawings where like reference numerals can indicate identical or functionally similar elements. Elements illustrated in the drawings are not necessarily drawn to scale. Additionally, certain embodiments can include more elements than illustrated in a drawing and/or a subset of the elements illustrated in a drawing. Further, some implementations can incorporate a suitable combination of features from two or more drawings.

The disclosure describes various illustrative implementations and examples for implementing the features and functionality of the present disclosure. The components, arrangements, and/or features are described in connection with various implementations and are merely examples to simplify the present disclosure and are not intended to be limiting. In the development of actual implementations, implementation-specific decisions can be made to achieve the developer's specific goals, including compliance with system, business, and/or legal constraints, which can vary from one implementation to another. Additionally, while such a development effort might be complex and time-consuming, it would be a routine undertaking for those of ordinary skill in the art having the benefit of this disclosure.

The attached drawings depict spatial relationships between various components and to the spatial orientation of various aspects of components. The devices, components, members, and apparatuses can be positioned in any orientation. Thus, the use of terms such as "above", "below", "upper", "lower", "top", "bottom", or other similar terms to describe a spatial relationship between various components or to describe the spatial orientation of aspects of such components describes a relative relationship between the components or a spatial orientation of aspects of such components, respectively, as the components described can be oriented in any direction.

The systems, methods and devices of this disclosure have several innovative aspects, no one of which is solely responsible for the attributes disclosed herein. Some objects or advantages might not be achieved by implementations described herein. Thus, for example, certain implementations can operate in a manner that achieves or optimizes one advantage or group of advantages as taught herein and not other objects or advantages as taught or suggested herein.

In one example implementation, electrical circuits of the drawings can be implemented on a board of an associated electronic device. The board can be a general circuit board that can hold various components of the internal electronic system of the electronic device and, further, provide connectors for other peripherals. More specifically, the board can provide the electrical connections by which other components of the system can communicate electrically. Any processors (inclusive of digital signal processors, microprocessors, supporting chipsets, etc.) and computer-readable non-transitory memory elements can be coupled to the board based on configurations, processing demands, and computer designs. Other components such as external storage, additional sensors, controllers for audio/video display, and peripheral devices can be attached to the board as plug-in cards, via cables, or integrated into the board itself. In various implementations, the functionalities described herein can be implemented in emulation form as software or firmware running within one or more configurable (e.g., programmable) elements arranged in a structure that supports these functions. The software or firmware providing the emulation can be provided on one or more non-transitory, computer-readable storage media including instructions to allow one or more processors to carry out those functionalities.

In another example implementation, the electrical circuits of the drawings can be implemented as stand-alone modules (e.g., a device with associated components and circuitry configured to perform a specific application or function) or implemented as plug-in modules into application specific hardware of electronic devices. Implementations of the present disclosure can be readily included in a system-on-chip (SOC) package. An SOC represents an integrated circuit (IC) that integrates components of a computer or other electronic system into one chip. The SOC can contain digital, analog, mixed-signal, and often radio frequency functions that can be provided on one chip substrate. Other embodiments can include a multi-chip-module (MCM), with a plurality of separate ICs located within one electronic package and that interact through the electronic package. In various other implementations, the processors can be implemented in one or more silicon cores in Application Specific Integrated Circuits (ASICs), Field Programmable Gate Arrays (FPGAs), programmable array logic (PAL), generic array logic (GAL), and other semiconductor chips.

The specifications, dimensions, and relationships outlined herein (e.g., the number of processors and logic operations) have been offered for non-limiting purposes of example and teaching. Such information can be varied considerably. For example, various modifications and changes can be made to arrangements of components. The description and drawings are, accordingly, to be regarded in an illustrative sense, not in a restrictive sense.

With the numerous examples provided herein, interaction was described in terms of two, three, four, or more electrical components for purposes of clarity and example. The system can be consolidated in any manner. Along similar design alternatives, the illustrated components, modules, and elements of the drawings can be combined in various possible configurations within the scope of this disclosure. In certain cases, it might be easier to describe one or more of the functionalities of a given set of flows by referencing a limited number of electrical elements. The electrical circuits of the drawings and their teachings are readily scalable and can accommodate many components, as well as more complicated/sophisticated arrangements and configurations. Accordingly, the examples provided do not limit the scope or inhibit the teachings of the electrical circuits as potentially applied to a myriad of other architectures.

In this disclosure, references to various features (e.g., elements, structures, modules, components, steps, operations, characteristics, etc.) included in "one implementation", "example implementation", "an implementation", "another implementation", "some implementations", "various implementations", "other implementations", "alternative implementation", and the like are intended to mean that any such features are included in one or more implementations of the present disclosure and might or might not necessarily be combined in the same implementations. Some operations can be deleted or omitted where appropriate, or these operations can be modified or changed considerably. In addition, the timing of these operations can be altered considerably. The preceding operational flows have been offered for purposes of example and discussion. Implementations described herein provide flexibility in that any suitable arrangements, chronologies, configurations, and timing mechanisms can be provided.

EXAMPLES

In Example A1, an apparatus includes a first sensor; and a network interface that sends a registration request and receives a recording request, the registration request indicating an identity of the first sensor, an Internet address of the apparatus, and a physical address of the apparatus, the recording request identifying the first sensor, wherein the first sensor records data to produce a recording, at least in part based on the recording request.

Example A2 is the apparatus according to Example A1, further comprising: a processing unit configured to encrypt the recording with a key, wherein the network interface receives an encryption request including the key.

Example A3 is the apparatus according to Example A2, wherein the network interface receives a registration response including an Internet address of a server and transmits, to the Internet address of the server, a recording response including the recording.

Example A4 is the apparatus according to any of Examples A1-A3, further comprising: a motor that changes a position or an orientation of the first sensor, at least in part based on the recording request.

Example A5 is the apparatus according to any of Examples A1-A4, further comprising: a global positioning sensor to obtain a position of the apparatus, wherein the physical address is at least in part based on the position.

Example A6 is the apparatus according any of Examples A1-A5, further comprising: a processing unit that powers up the first sensor, at least in part based on the recording request.

Example A7 is the apparatus according to any of Examples A1-A6, further comprising: a second sensor, wherein the network interface receives a ping request from a ping address and transmits a ping response to the ping address, the ping response indicating a physical address of the apparatus, the ping response further indicating the second sensor.

In Example A8, a non-transitory, computer-readable medium is encoded with instructions that, when executed by a processing unit of an apparatus, cause the apparatus to perform operations. The operations include sending a registration request, the registration request indicating an identity of a first sensor of the apparatus, an Internet address of the apparatus, and a physical address of the apparatus; receiving a recording request, the recording request identifying the first sensor; and recording data with the first sensor to produce a recording, at least in part based on the recording request.

Example A9 is the medium according to Example A8, the operations further comprising: receiving an encryption request including a key; and encrypting the recording with the key.

Example A10 is the medium according to Example A9, the operations further comprising: receiving a registration response including an Internet address of a server; and transmitting, to the Internet address of the server, a recording response including the recording.

Example A11 is the medium according to any of Examples A8-A10, the operations further comprising: changing, with a motor, a position or an orientation of the first sensor, at least in part based on the recording request.

Example A12 is the medium according to any of Examples A8-A11, the operations further comprising: obtaining, with a global positioning sensor, a position of the apparatus, wherein the physical address is at least in part based on the position.

Example A13 is the medium according to any of Examples A8-A12, the operations further comprising: powering up the first sensor, at least in part based on the recording request.

Example A14 is the medium according to any of Examples A8-A13, the operations further comprising: receiving a ping request from a ping address; and transmitting a ping response to the ping address, the ping response indicating a physical address of the apparatus, the ping response further indicating a second sensor.

In Example A15, a method is implemented by a computing device, the method comprising: sending a registration request, the registration request indicating an identity of a first sensor of the apparatus, an Internet address of the apparatus, and a physical address of the apparatus; receiving a recording request, the recording request identifying the first sensor; and recording data with the first sensor to produce a recording, at least in part based on the recording request.

Example A16 is the method according to Example A15, further comprising: receiving an encryption request including a key; and encrypting the recording with the key.

Example A17 is the method according to Example A16, further comprising: receiving a registration response including an Internet address of a server; and transmitting, to the Internet address of the server, a recording response including the recording.

Example A18 is the method according to any of Examples A15-A17, further comprising: changing, with a motor, a position or an orientation of the first sensor, at least in part based on the recording request.

Example A19 is the method according to any of Examples A15-A18, further comprising: obtaining, with a global positioning sensor, a position of the apparatus, wherein the physical address is at least in part based on the position.

Example A20 is the method according to any of Examples A15-A19, further comprising: powering up the first sensor, at least in part based on the recording request.

Example A21 is the method according to any of Examples A15-A20, further comprising: receiving a ping request from a ping address; and transmitting a ping response to the ping address, the ping response indicating a physical address of the apparatus, the ping response further indicating a second sensor.

In Example B1, an apparatus includes a network interface that receives a registration request and an event notification, the registration request indicating an identity of a sensor and a physical location of the sensor, the event notification identifying a location of an event; and a processing unit configured to determine a first geofence, at least in part based on a location and a distance from the location, the processing unit further configured to determine that the sensor is within the first geofence, at least in part based on the physical location of the sensor, the network interface transmits a request indicating the sensor and receives a response including data associated with the sensor.

Example B2 is the apparatus according to Example B1, wherein the network interface receives an authorization request from a third-party server, and the client device is identified at least in part based on the authorization request.

Example B3 is the apparatus according to any of Examples B1-B2, wherein the processing unit further is configured to determine a second geofence, at least in part based on a jurisdiction and an emergency service for the event.

Example B4 is the apparatus according to Example B3, wherein the event notification indicates an identity of a safety access device, and the processing unit further is configured to authenticate the safety access device, at least in part based on the second geofence and the identity of the safety access device.

Example B5 is the apparatus according to any of Examples B1-B4, wherein the processing unit further is configured to determine a third geofence identifying an adjacent jurisdiction, and the network interface transmits a notification to a safety access device within the adjacent jurisdiction.

Example B6 is the apparatus according to any of Examples B1-B5, wherein the network interface receives a sensor request indicating an Internet address of a safety access device; and the network interface transmits a sensor response indicating at least one sensor of the client device, based on the location, the sensor response indicating the Internet address of the third-party.

Example B7 is the apparatus according to any of Examples B1-B6, wherein the registration request includes an Internet address of the client device, the network interface transmits a ping request to the Internet address of the client device, and the network interface receives a ping response indicating the sensor of the client device.

Example B8 is a method performed by the apparatus of any of Examples B1-B7.

Example B9 is a computer-readable medium including instructions that, when executed by a processing unit, perform operations of the method of Example B8.

In Example C1, an apparatus includes a network interface that receives an identification of an event and that sends a session request, the session request identifying a location of the event and an Internet address of the apparatus, wherein the network interface receives a sensor selection request indicating a sensor; and a display that displays a physical location of a sensor, at least in part based on the sensor selection request, wherein the network interface transmits a sensor selection response indicating the sensor.

Example C2 is the apparatus according to Example C1, wherein the network interface transmits a distance from the location.

Example C3 is the apparatus according to any of Examples C1-C2, wherein the processing unit further is configured to negotiate an event ID for the event, and the network interface transmits an audit request indicating the event ID.

Example C4 is the apparatus according to any of Examples C1-C3, wherein the network interface transmits a command to control a motor of a client device including the sensor.

Example C5 is the apparatus according to any of Examples C1-C4, wherein the network interface receives a session key, and the processing unit further is configured to decrypt the data with the session key.

Example C6 is the apparatus according to any of Examples C1-C5, further comprising: a processing unit configured to decrypt data to produce an image, wherein the display displays the image, and the network interface receives the data associated with the sensor of the device.

Example C7 is the apparatus according to any of Examples C1-C6, wherein the display displays the geofence and an indication of at least one sensor of a client device in the geofence.

Example C8 is a method performed by the apparatus of any of Examples C1-C7.

Example C9 is a computer-readable medium including instructions that, when executed by a processing unit, perform operations of the method of Example C8.

In Example D1, an apparatus includes a network interface that receives a device registration request identifying an identity of a client device, an Internet address of the client device, and a physical location of the client device; and a processing unit configured to determine an identity of at least one sensor of the client device, at least in part based on the identity of the client device, wherein the network interface transmits, to an address of a server, the identity of the client device, the physical location of the client device, and an identity of the at least one sensor of the client device, and the network interface receives data from the at least one sensor of the client device.

Example D2 is the apparatus according to Example D1, wherein the processing unit further is configured to determine the address of the server, at least in part based on the device registration request.

Example D3 is the apparatus according to any of Examples D1-D2, wherein the network interface transmits the encrypted data to the address of the server.

Example D4 is the apparatus according to any of Examples D1-D3, wherein the network interface receives, from the server, a recording request for data from the at least one sensor, and the network interface transmits a request for data to the Internet address of the client device, the request identifying the at least one sensor.

Example D5 is the apparatus according to any of Examples D1-D4, wherein the network interface receives an encryption request including a client session key, and the processing unit further is configured to encrypt the data with the client session key to produce encrypted data.

Example D6 is the apparatus according to any of Examples D1-D5, wherein the network interface transmits to the client device an address of a server and a key.

Example D7 is the apparatus according to any of Examples D1-D6, wherein the processing unit further is configured to decrypt the data from the client device with a first key.

Example D8 is a method performed by the apparatus of any of Examples D1-D7.

Example D9 is a computer-readable medium including instructions that, when executed by a processing unit, perform operations of the method of Example D8.

In Example E1, an apparatus includes a network interface that receives a device registration request identifying an identity of a client device and a location of the client device, wherein the network interface receives a session request indicating a location of an event, an Internet address of a public safety device, an identity of the public safety device, and a distance from the event; and a processing unit configured to determine a first geofence, at least in part based on the location of the event and the distance from the event, the processing unit further configured to determine the client device is within the first geofence, at least in part based on the location of the client device, wherein the network interface receives data from the client device, the processing unit further is configured to encrypt the data with a session key to produce encrypted data, and the network interface transmits the encrypted data to the Internet address of the public safety device.

Example E2 is the apparatus according to Example E1, wherein the processor further is configured to authorize the session request, at least in part based on the identity of the public safety device.

Example E3 is the apparatus according to any of Examples E1-E2, wherein the network interface receives an Internet address of the client device.

Example E4 is the apparatus according to any of Examples E1-E3, wherein the processor further is configured to determine a second geofence at least in part based on a jurisdiction in which the location of the event is present.

Example E5 is the apparatus according to any of Examples E1-E4, wherein the session request indicates an identity of a safety access device, and the processor further is configured to authenticate the safety access device, at least in part based on the second geofence and the identity of the safety access device.

Example E6 is the apparatus according to any of Examples E1-E5, wherein the processing unit further is configured to decrypt the data received from the client device.

Example E7 is the apparatus according to any of Examples E1-E6, wherein the processing unit further is configured to determine a third geofence identifying an adjacent jurisdiction and to determine an address of another safety access device, based on the adjacent jurisdiction, and the network interface transmits a notification of the event to the other safety access device.

Example E8 is a method performed by the apparatus of any of Examples E1-E7.

Example E9 is a computer-readable medium including instructions that, when executed by a processing unit, perform operations of the method of Example E8.

We claim:

1. A method, comprising:
    receiving a registration request, an identification of a safety access device, and an event notification, the registration request indicating an identity of a sensor and a physical location of the sensor, the event notification identifying a location of an event;
    determining a jurisdiction monitored by the safety access device;
    determining a first geofence, at least in part based on the jurisdiction and an emergency service for the event;
    determining a second geofence, at least in part based on the location and a distance from the location;
    determining that the sensor is within the second geofence, at least in part based on the physical location of the sensor;
    transmitting data representing the first geofence and the second geofence;
    transmitting a sensor selection request indicating the identity of the sensor and at least one of the physical location of the sensor or a distance of the sensor from the event;
    receiving a sensor selection response indicating the sensor;
    transmitting a request indicating the sensor, at least in part based on the sensor selection response; and
    receiving a response including data associated with the sensor.

2. The method according to claim 1, further comprising:
    authenticating the safety access device, at least in part based on the first geofence and the identification of the safety access device, wherein the event notification indicates the identification of the safety access device.

3. The method according to claim 1, further comprising:
    determining a third geofence identifying an adjacent jurisdiction; and
    transmitting a notification to a safety access device within the adjacent jurisdiction.

4. The method according to claim 1, further comprising:
    receiving a first sensor request indicating an Internet address of the safety access device; and
    transmitting a second sensor request indicating the sensor, at least in part based on the location, the second sensor request indicating an Internet address of a third-party server.

5. The method according to claim 1, further comprising:
    determining the event, at least in part based on the identification of the safety access device.

6. An apparatus, comprising:
    a network interface that receives a registration request, an identification of a safety access device, and an event notification, the registration request indicating an identity of a sensor and a physical location of the sensor, the event notification identifying a location of an event; and
    a processing unit configured to determine a jurisdiction monitored by the safety access device, to determine a first geofence, at least in part based on the jurisdiction and an emergency service for the event, and to determine a second geofence, at least in part based on the location and a distance from the location, the processing unit further configured to determine that the sensor is within the second geofence, at least in part based on the physical location of the sensor, wherein
    the network interface transmits data representing the first geofence and the second geofence and transmits a sensor selection request indicating the identity of the sensor and at least one of the physical location of the sensor or a distance of the sensor from the event,
    the network interface receives a sensor selection response indicating the sensor, and the network interface transmits a request indicating the sensor, at least in part based on the sensor selection response, and receives a response including data associated with the sensor.

7. The apparatus according to claim 6, wherein the event notification indicates the identification of the safety access device, and the processing unit further is configured to authenticate the safety access device, at least in part based on the first geofence and the identification of the safety access device.

8. The apparatus according to claim 6, wherein the processing unit further is configured to determine a third geofence identifying an adjacent jurisdiction, and the network interface transmits a notification to a safety access device within the adjacent jurisdiction.

9. The apparatus according to claim 6, wherein the network interface receives a first sensor request indicating an Internet address of the safety access device, and the network interface transmits a second sensor request indicating the sensor, at least in part based on the location, the second sensor request indicating an Internet address of a third-party server.

10. The apparatus according to claim 6, wherein the registration request includes an Internet address for the sensor, the network interface transmits a ping request to the Internet address for the sensor, and the network interface receives a ping response indicating the sensor.

11. The apparatus according to claim 6, wherein the processing unit further is configured to determine the event, at least in part based on the identification of the safety access device.

12. A non-transitory, computer-readable medium including instructions that, when executed by a processing unit, perform operations comprising:
    receiving a registration request, an identification of a safety access device, and an event notification, the registration request indicating an identity of a sensor and a physical location of the sensor, the event notification identifying a location of an event;
    determining a jurisdiction monitored by the safety access device;
    determining a first geofence, at least in part based on the jurisdiction and an emergency service for the event;
    determining a second geofence, at least in part based on the location and a distance from the location;
    determining that the sensor is within the second geofence, at least in part based on the physical location of the sensor;

transmitting data representing the first geofence and the second geofence;

transmitting a sensor selection request indicating the identity of the sensor and at least one of the physical location of the sensor or a distance of the sensor from the event;

receiving a sensor selection response indicating the sensor;

transmitting a request indicating the sensor, at least in part based on the sensor selection response; and receiving a response including data associated with the sensor.

13. The medium according to claim 12, the operations further comprising:

authenticating the safety access device, at least in part based on the first geofence and the identification of the safety access device, wherein the event notification indicates the identification of the safety access device.

14. The medium according to claim 12, the operations further comprising:

determining a third geofence identifying an adjacent jurisdiction; and transmitting a notification to a safety access device within the adjacent jurisdiction.

15. The medium according to claim 12, the operations further comprising:

receiving a first sensor request indicating an Internet address of the safety access device; and transmitting a second sensor request indicating the sensor, at least in part based on the location, the second sensor request indicating an Internet address of a third-party server.

16. The medium according to claim 12, the operations further comprising:

transmitting a ping request to an Internet address for the sensor, wherein the registration request includes the Internet address for the sensor; and receiving a ping response indicating the sensor.

17. The medium according to claim 12, the operations further comprising:

determining the event, at least in part based on the identification of the safety access device.

* * * * *